May 3, 1949.  E. F. ROSSMAN  2,469,275
HYDRAULIC BUFFER
Filed July 4, 1945  2 Sheets-Sheet 1

INVENTOR
EDWIN F. ROSSMAN
BY
Spencer, Hardman and Fehr
HIS ATTORNEYS

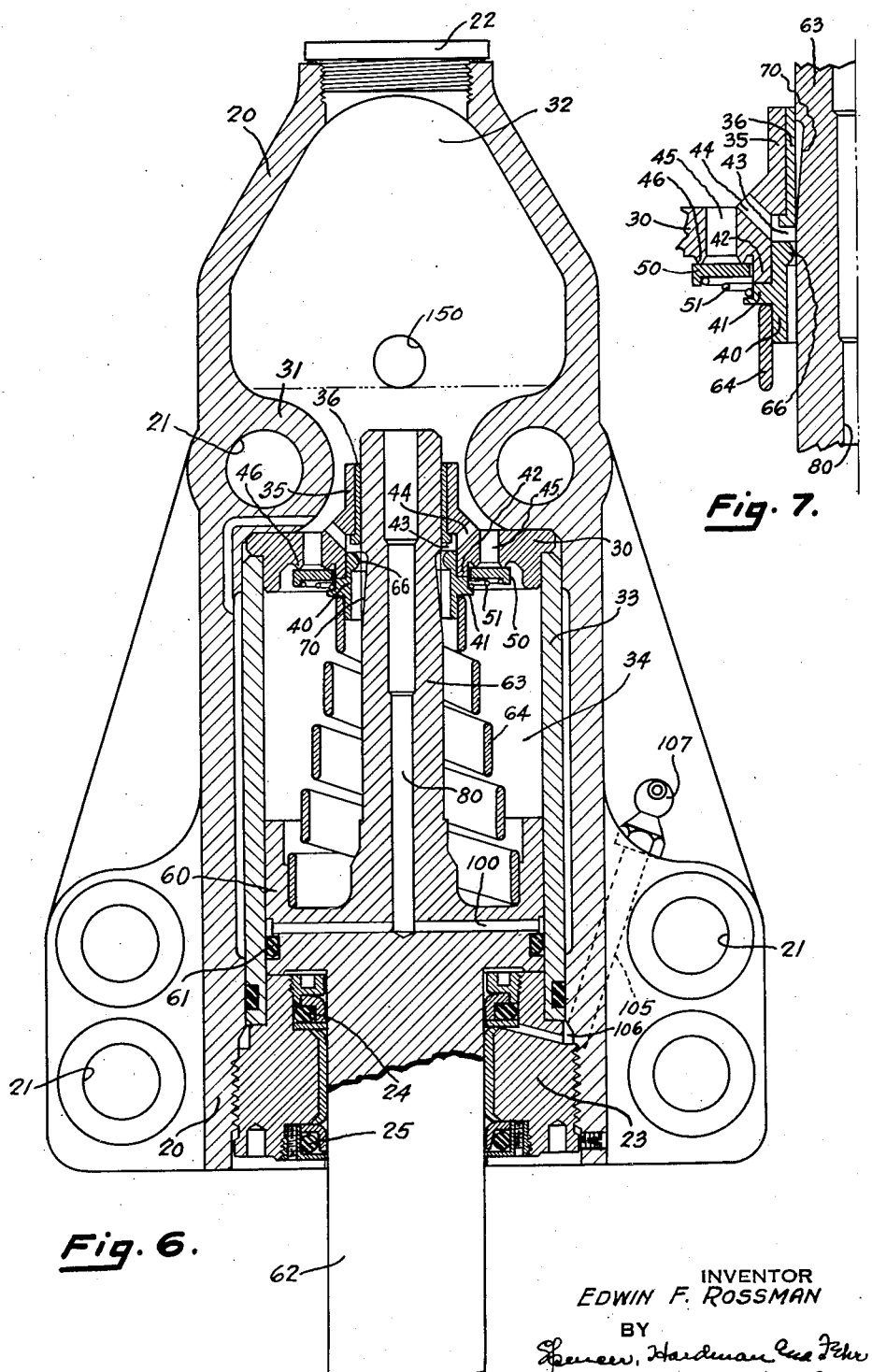

Patented May 3, 1949

2,469,275

UNITED STATES PATENT OFFICE 2,469,275

HYDRAULIC BUFFER

Edwin F. Rossman, Dayton, Ohio, assignor to General Motors Corporation, Detroit, Mich., a corporation of Delaware Application July 4, 1945, Serial No. 603,179

10 Claims. (Cl. 267—64)

This invention relates to improvements in cushioning devices particularly of the hydraulic type.

It is among the objects of the present invention to provide an hydraulic buffer adapted to cushion the approaching movement of the relatively movable members to prevent crashing engagement thereof.

Further objects and advantages of the present invention will be apparent from the following description, reference being had to the accompanying drawings wherein a preferred embodiment of the present invention is clearly shown.

In the drawings:

Fig. 5 is a section taken along the line 5—5 of Fig. 2.

Fig. 6 is a longitudinal sectional view of a modified form of buffer.

Fig. 7 is a fragmentary, sectional view of the fluid flow control mechanism of Fig. 6, in another position however.

The device of the present invention is an hydraulic buffer for cushioning the approaching movement of the relatively movable members. The device as illustrated is particularly designed for use on tanks in which the device is attached to the main body of the vehicle so that a movable portion of the device may be engaged by the running gear when the body and running gear, one spring supported upon the other, move to approach each other.

Figure 1:
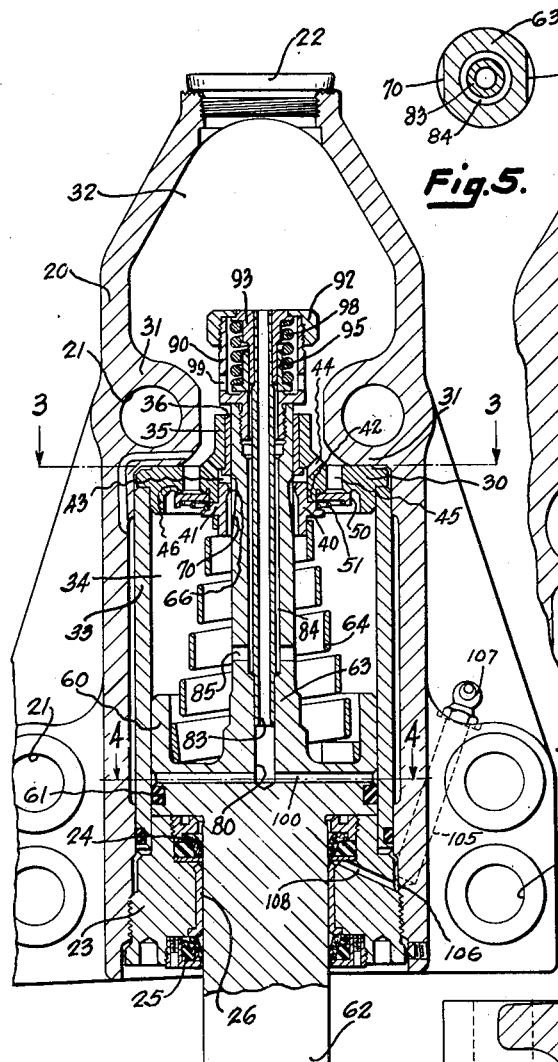
Fig. 1 is a longitudinal sectional view through the center of the device in normal position.

As shown in Fig. 1, the device comprises a housing 20 having openings 21 for receiving bolts by means of which the device is attached to the body of the tank not shown in the present drawings.

The housing 20 has a tubular shaped body portion shown in section in Fig. 1, the one end of which is closed by a screw plug 22, the opposite end being threaded interiorly to receive the member 23 having a central opening both ends of which are recessed. One recessed end of this member 23 receives the packing gland 24 the other end the packing gland 25. Between the two packing glands the opening is lined with a sleeve bearing 26.

In the tubular portion of the housing and substantially midway between its ends there is provided a partition member 30 which abuts against two oppositely disposed, inwardly extending lugs 31 in the housing, each lug being bared to provide an opening 21 for the attachment bolts mentioned. The partition member divides the housing into two compartments, the one designated by the numeral 32 being a fluid reservoir. The other compartment contains the cylinder 33 which is interposed and secured between the partition member 30 and the member 23. Each of said members has an outer annular counterbore providing a projecting nose portion which fits tightly into the respective end of the cylinder 33 forming the working chamber 34 in the cylinder. Screwing the member 23 tightly into the housing opening clamps the cylinder 33 against the partition member 30 and the latter upon the lugs 31.

The partition 30 has a central opening a part of which is defined by a cylindrical protuberance 35 extending into the fluid reservoir 32. In this protuberance 35 there is provided a sleeve bearing 36 which has an outwardly extending annular flange abutting against a shoulder formed in the member 30 by a counterbore therein.

One end of a metering collar 40 fits and partially extends into said recess in the partition member 30, and has an outwardly extending, annular flange 41 which abuts against the bottom edge of a depending annular extension 42 on the partition member. Inasmuch as collar 40 does not extend into the recess for its full depth, but has its inner end spaced from the annular flange on the sleeve bearing 36, an annular space 43 is formed in the partition member 30 between said bearing 36 and collar 40.

Figure 2:
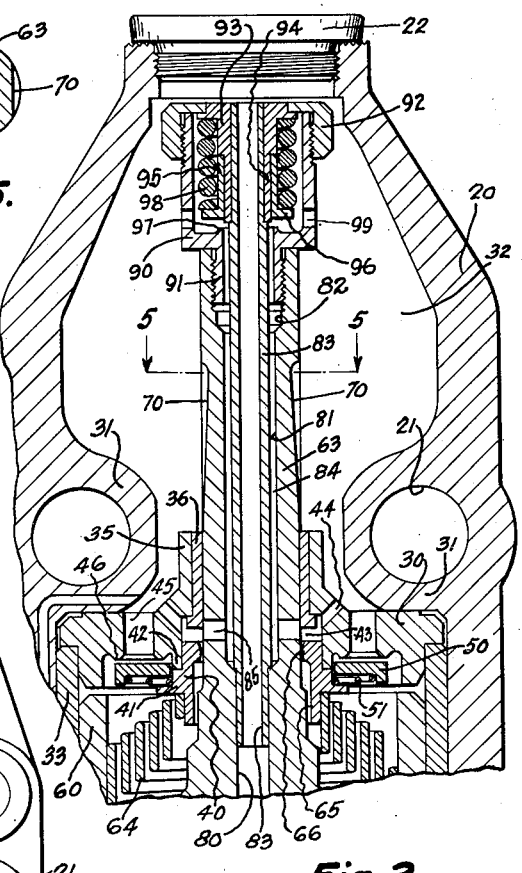
Fig. 2 is an enlarged, fragmentary sectional view of a portion of the device shown in Fig. 1, in extreme compressed position, however.
Figure 3:
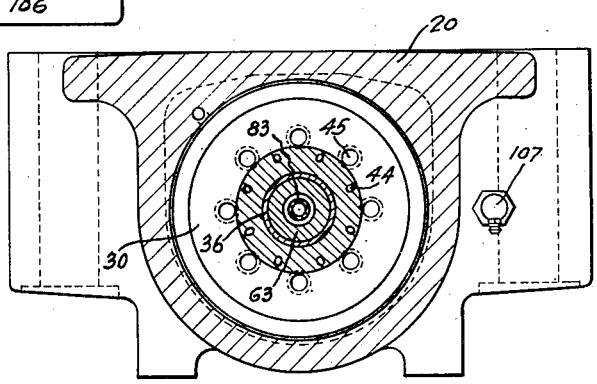
Fig. 3 is a transverse section taken along the line 3—3 of Fig. 1.
Figure 4:
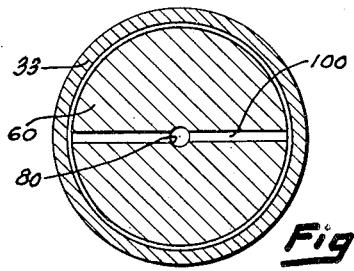
Fig. 4 is a transverse section taken along the line 4—4 of Fig. 1.

A series of openings 44 in the partition 30 provide communication between the annular space 43 and the fluid reservoir 32 as clearly illustrated in Figs. 1 and 2. Another series of openings 45, arranged in a circular row as shown in Fig. 3, are provided in the partition 30. Surrounding the inner end of each opening, or more particularly the end opening into the cylinder chamber 34 is an annular ridge 46, forming a valve seat. All valve seats 46 are engaged by the ring valve 50 urged upon the several valve seats by the spring 51 which is interposed between the valve 50 and the flange 41 of the metering collar 40. This valve 51 normally closes the openings 45 but under certain circumstances is moved from said seats to establish a substantially unrestricted flow of fluid from the reservoir 32 into the working cylinder chamber 34.

A piston 60 is reciprocative in the cylinder 33. An annular groove in the outer surface of the piston contains a packing ring 61 which engages the cylinder wall and forms a sliding seal between the piston and cylinder.

The piston has two oppositely disposed coaxial extensions. The extension 62 is solid and is slidably supported in the sleeve bearing 26 carried by the member 23 and is sealingly engaged by the packing glands 24 and 25. It extends beyond the confines of the member 23 to the exterior of the housing 20 so as to be engageable by the running gear of the tank, to the body of which the device is attached.

The oppositely disposed extension 63, coaxial of the piston 60, extends through the partition 30 into the fluid reservoir 32, said extension 63 being slidably supported in the sleeve bearing 36 secured in the cylindrical protuberance 35 of the partition 30. A helically wound spring 64 has its one end abutting against the collar 40, the other end against the piston 60. This spring normally maintains the collar 40 in position on the partition 30 and urges the piston 60 upon the member 23 so that the extension 62 of the piston normally extends beyond the confines of the housing as shown in Fig. 1.

A counterbore 65 in collar 40 provides a portion larger in diameter than the normal diameter portion 66 of the collar, said portion 66 being predeterminately greater in diameter than the portion of the extension 63 which slides in the bearing 36, thereby providing an annular space between the extension 63 and collar 40 of predetermined fluid flow capacity. The counterbored portion 65 of the collar provides a much greater annular space between the collar and extension.

Metering slots are provided in the surface of the piston extension 63. The present drawings show these slots to be diametrically opposite flat portions 70 the top ends of which, when the piston is in normal position as shown in Fig. 1, are directly beneath the lower end of the sleeve bearing 36, their lower ends terminating at a level on the extension coinciding approximately with the upper end of the protruding cylindrical portion 35 of the partition 30 when the piston 60 is in its fully operated position as shown in Fig. 2. The length positions of these slots will vary in accordance with the control this particular device is intended to provide. These slots, provided by the flats 70, taper longitudinally, the ends of the slots or flats more adjacent the outer end of the projections 63 being of a predetermined depth, said flats then tapering to blend into and merge with the outer surface of the projection more adjacent the piston 60.

As shown in Fig. 1, the slots or flats 70 cooperate with the portion 66 of collar 40 to form a restricting passage normally of predetermined fluid flow capacity which passage opens into the annular space 43 between collar 40 and bearing 36 and which is in communication with the fluid reservoir by passages 44 in the partition 30. The tapering slots or flats 70 progressively decrease in fluid flow capacity as the piston moves upwardly and therefore offer a variable restriction to fluid flow.

The piston extension 63 is centrally recessed for substantially its complete length. This recess has three portions 80, 81 and 82 each of a different diameter. The portion 80 is the smallest in diameter and has one end of the standpipe 83 press fitted therein said pipe extending beyond the outer end of the extension 63. Thus an annular space 84 is provided between the pipe 83 and the inner wall of the recessed portions 81 and 82 of the extension, side openings 85 in said extension, adjacent the bottom of the recess portion 81 thereof, connecting said annular space 84 with the working chamber 34 of the cylinder 33.

A pressure relief valve is secured to the end of the piston projection 63 for controlling the fluid flow through the annular space 84 as the piston is moved toward the partition 30. This relief valve comprises a housing 90 having a tubular nipple portion 91 threaded into the recessed portion 82 of the extension 63. A cap 92 is threaded to the housing 90, said cap having a central opening into which a flange on the sleeve 93 snugly fits. This sleeve 93 fits about the pipe 83 and is forced against an annular shoulder on the pipe by the clamping effect of the cap 92. A portion of the sleeve 93 is of reduced diameter as at 94 and upon this reduced diameter portion a sleeve valve 95 is slidably carried. Valve 95 has an outwardly extending annular flange 96 which is yieldably urged by spring 98 upon the annular ridge 97, surrounding the central opening in the housing 90 and its nipple 91. This opening is of greater diameter than the outer diameter of the pipe 83 extending therethrough. Spring 98 is interposed between the flange 96 of the sleeve valve 94 and the flange of sleeve 93. The outer diameter of the reduced portion 94 of sleeve 93 is predeterminately less than the inner diameter of the opening in the housing and its nipple 91 surrounded by the valve seat 97 so that a predetermined portion of the valve 95 is exposed or effective to fluid pressure. Side openings 99 in housing 90 connect the interior of said housing 90 with the fluid reservoir 32.

From the aforegoing it may clearly be seen that, as the piston moves upwardly, away from the member 23 toward the partition 30, two restricted flows of fluid are established from the working chamber 34 into the reservoir 32 to resist said piston movement. One of these flows, around the extension through the variable space between the collar 40 and the tapering flats 70 on the extension, is gradually, increasingly restricted as the piston moves upwardly, the other flow through the extension and past valve 95 is restricted in accordance with the fluid pressure within the working chamber 34. An additional resistance to the upward movement of the piston 60 is also provided by the subatmospheric pressure created between the piston and member 23 inasmuch as this space is sealed by the seal ring 61 on the piston and the packings 23 and 24 around the extension 62 on the piston.

Any fluid tending to leak past the piston 60 will find its way back to the fluid reservoir via the cross passage 100 in the piston which passage connects with the pipe 83 as shown in Fig. 1.

A duct 105 in the housing 20 has its inner end leading to an annular space 106 found between the inner wall of the housing 20 and a reduced diameter portion of the member 23, the outer end of this duct 105 having a nipple fitting 107. Member 23 has a passage 108 leading from the annular space 106 to the interior of bearing 26. This provides a means of flushing the bearing 26 and packings 24 and 25 free from any dirt that may possibly be present or also for forcing packing grease into the bearing and packing orifices which assists in sealing the space beneath the piston 60.

As has been stated before, the device of the present invention is attached to the sprung mass or body of a vehicle such as a tank or truck. It is attached in such a manner that a part of the unsprung mass or running gear may strike the piston portion 62 extending from the device and move the piston 60 upwardly, when the running gear is thrust upwardly toward the body of the vehicle. As the piston moves upwardly it exerts pressure upon the fluid within the cylinder chamber 34 to discharge it therefrom. Two means of egress for the fluid are provided. The first to become effective are the passages provided between the flats 70 on the extension 63 and the portion 66 of the collar 40, which passages open into the annular space 43 in communication with the fluid reservoir 32 through passages 44 in the partition 30. At the beginning of the piston movement from its normal position on the member 23, the spaces between the collar portion 66 and the flat surfaces 70 are maximum and any fluid passing therethrough at this time will be least restricted. However, as the piston moves closer to the partition 30, these spaces between the collar portion 66 and the flat surfaces 70 will progressively be decreased and consequently the fluid flow therethrough is increasingly restricted. From this it may be seen that initially the piston movement is slightly resisted due to the slight restriction to fluid flow between the extension 63 and the collar portion 66 and through the openings 44 into the fluid reservoir 32. However as the restriction to fluid flow is increased as described above, movement of the piston upwardly is correspondingly, increasingly resisted until the normal diameter portion of the extension enters the confines of the collar portion 66 at which time the maximum restriction to fluid flow is provided and consequently the greatest resistance to piston movement upwardly. This therefore provides a control for piston movement in accordance with the position of the piston in the working cylinder.

Another means for controlling upward movement of the piston is provided. This control is effective in accordance with the fluid pressure within the cylinder. If the movement of the piston upwardly is of such a character that the spaces between the flats 70 and collar portion 66 cannot effectively transfer the displaced fluid from the cylinder to the reservoir, then an increased fluid pressure will be existant in the cylinder chamber 34 which, when it reaches a predetermined value will move the valve 95 from its seat 97 against the effect of spring 98 thereby establishing another restricted fluid flow from the said cylinder chamber 34 through the openings 85, annular space 84, past valve 95 through the openings 99 in the valve housing 90 into the fluid reservoir 32.

As the piston 60 moves away from the member 23 a subatmospheric condition therebetween will be created due to the fact that the space is completely sealed against atmosphere. This then, adds to the resistance to piston movement inwardly. From this it may be seen that the movement of the running gear of the vehicle to approach the body or frame is controlled. This approaching movement is increasingly resisted whereby "bottoming" which is the bumping of the body upon the running gear and may prove disastrous if freely permitted, is substantially eliminated and prevented by the present device.

As the body or frame moves away from the running gear, the piston is returned to its normal position on the member 23 by the spring 64. In response to this movement of the piston 60 away from the partition 30, valve 50 will be moved from engagement with the valve-seats 46 around the several openings 45 against the effect of spring 51 and as a result a substantially unrestricted flow of fluid from the reservoir 32 into the cylinder chamber 34 is established, thereby filling said chamber with fluid preparatory to its next upward movement.

The Figs. 6 and 7 illustrate a modified form of buffer. In this construction the tube 83 and the pressure relief valve including the housing 90, valve 96, spring 98 and sleeve 93 are completely omitted. Fluid leaking past the piston and cylinder wall is returned to the fluid reservoir 32 via the annular groove which contains the packing ring 61, the duct 100 and recess 80 in the piston. All of the other parts of the modified form of buffer are identical with the buffer previously described and therefore this description together with the same reference numerals are applicable to the Figs. 6 and 7.

Suffice to say that in response to movement of the piston 60 toward the partition 30, only one fluid flow from the working cylinder chamber 34 is established and that flow follows through the annular space between the piston extension 63 and its grooves or flats 70 and the portion 66 of the metering collar 40, said flow being increasingly resisted as the piston moves to approach the partition 30.

The numeral 150 indicates the opening for introducing the fluid into the device.

While the embodiment of the present invention as herein disclosed, constitutes a preferred form, it is to be understood that other forms might be adopted, all coming within the scope of the claims which follow.

What is claimed is as follows:

1. An hydraulic buffer comprising in combination, a housing; a cylinder provided with end-heads secured within said housing and forming a fluid reservoir in the housing; a piston in the cylinder yieldably urged upon one of said end-heads and having a coaxial bumper shaft slidably protruding through an opening in said one end-head to the exterior of the housing; a hollow extension on the piston, oppositely disposed from but coaxial with the bumper shaft, said hollow extension being slidably supported by the other of said end-heads and extending into the fluid reservoir; dual fluid flow controlling means in said piston extension for establishing restricted fluid flows from the cylinder into the fluid reservoir in response to movement of the piston toward said other end-head, the one means cooperating with said other end-head to provide an increasingly restricted flow around the outside of the extension as the piston moves from engagement with the one said end-head toward the said other end head, the other fluid flow controlling means establishing another restricted fluid flow through the hollow extension in response to a predetermined fluid pressure within the working cylinder; and valved ducts in said other end-head operative to establish a substantially unrestricted flow of fluid from the reservoir into the working cylinder as the piston moves toward the said one end-head.

2. An hydraulic buffer comprising in combination, a housing; a cylinder provided with end-heads secured within said housing and forming a fluid reservoir in the housing; a piston in the cylinder, yieldably urged upon the one of said end-heads and having a coaxial bumper shaft slidably protruding through an opening in said one end-head to the exterior of the housing; a hollow extension on the piston, oppositely disposed from but coaxial with the bumper shaft, said hollow extension being slidably supported by the other of said end-heads and extending into the fluid reservoir; two separate fluid flow controlling means for establishing restricted fluid flows from the cylinder into the fluid reservoir in response to movement of the piston toward said other end-head, the one means comprising tapering slots in the outer surface of the hollow extension cooperating with the said other end-head to provide an increasingly restricted fluid flow around the extension, the second of said fluid flow controlling means comprising a spring loaded check valve carried by the hollow extension and operative to establish a restricted flow through the hollow extension in response to a predetermined fluid pressure in the working cylinder; and valved ducts in said other end-head operative to establish a substantially unrestricted flow of fluid from the reservoir into the working cylinder as the piston moves toward the said one end-head.

3. An hydraulic buffer comprising in combination, a housing; a cylinder provided with end-heads secured within the housing and forming a fluid reservoir in said housing; a piston in the cylinder; a spring urging the piston upon one of the cylinder end-heads; a bumper lug extending coaxially from the piston and slidably through an opening in said one cylinder end-head to the exterior of the housing; a hollow metering rod extending coaxially from the side of the piston opposite the bumper lug, slidably through an opening in the other of said cylinder end-head into the fluid reservoir and having dual means operative to establish restricted flows of fluid from the cylinder into the fluid reservoir in response to movement of the piston toward the said other cylinder end-head, one of said means comprising tapering, longitudinal slots in the outer surface of the metering rod which cooperates with said other cylinder end-head to control fluid flow outside said metering rod in accordance with the position of the piston in the cylinder, the other means comprising a spring loaded check valve, carried by said rod, and operative at a predetermined fluid pressure inside said metering rod to establish a restricted fluid flow through said rod; and valved ducts in said other cylinder end-head operative to establish a substantially unrestricted fluid flow from the reservoir into the cylinder as the piston is spring actuated toward the said one cylinder end-head.

4. An hydraulic buffer comprising in combination, a housing; a partition in said housing forming two compartments one of which is a fluid reservoir; a plug secured in the open end of the other compartment, opposite the partition; a cylinder in said other compartment secured between the partition and plug; a piston in said cylinder said piston having oppositely disposed, axial extensions, one slidably supported in and extending through an opening in the plug to the exterior of the housing, the other extension being slidably supported in and extending through an opening in the partition and having a central recess and side openings providing communication between the cylinder and reservoir; dual means provided by the recessed extension, one cooperating with the partition to provide an increasingly restricted fluid flow from the cylinder around said extension into the reservoir as the piston is moved from the plug toward the partition, the other providing a restricted fluid flow through the extension in response to a predetermined fluid pressure within said extension and the cylinder; a spring urging the piston upon the plug; and valved ducts in the partition operative to provide a substantially unrestricted fluid flow from the reservoir into the cylinder as the piston is moved toward the plug by the spring.

5. An hydraulic buffer comprising in combination, a housing; a cylinder assembly in the housing comprising a cylinder member with a head member at each end, the one of the head members being urged against abutments in the housing by the other head member adjustably attached to the housing; a bearing provided in a central opening of each head; a piston in the cylinder member, having portions slidably supported in the respective bearings; valved ducts in the said one head member operative to establish a substantially free flow of fluid into the cylinder as the piston moves away from said one head member; a series of ducts in the said one head member communicating with an annular recess in the said one head member on its cylinder side and beneath the bearing therein; a metering collar in said recess; longitudinally tapering grooves in the piston cooperating with the metering collar increasingly to restrict fluid flow from the cylinder through said one head member as the piston is moved toward it; and a spring yieldably urging the piston away from said one head member against the other head member.

6. An hydraulic buffer comprising in combination, a housing having a cylindrically shaped portion provided with oppositely disposed inwardly extending lugs; a centrally apertured partition member abutting said lugs and dividing the housing into two compartments one of which is a fluid reservoir; a cylinder in the other housing compartment and engaging the partition; a centrally apertured head member adjustably secured in the housing and engaging the end of the cylinder opposite the partition; bearings in the apertures of the partition and head member; a piston in the cylinder, having oppositely disposed extensions slidably supported in the respective bearings, the extension supported by the partition bearing having tapering metering grooves in its surface on the side of said bearing adjacent the cylinder when the piston is in normal position; a spring yieldably urging the piston against the head member; valved ports in the partition, operative in response to movement of the piston away from said partition, to establish a substantially free flow of fluid from the reservoir into the cylinder; and a passage through the partition, shunting the bearing therein, said passage having a metering sleeve cooperating with the metering grooves of the piston increasingly to restrict the flow of fluid from the cylinder into the fluid reservoir as the piston is moved toward the partition.

7. An hydraulic shock absorber comprising in combination, a cylindrically shaped housing in which are provided inwardly extending lugs; a partition in the housing, abutting the lugs and providing two compartments therein, one of which is a fluid reservoir; a cylinder in the housing engaging the partition; a head threaded in the housing and engaging the cylinder to urge it against the partition; a piston in the cylinder, having oppositely disposed extensions one of which slidably extends through the partition the other through the head to the exterior of the housing; sealing gaskets in the head engaging the shaft extension; valved ports in the partition operative to permit a substantially unrestricted flow of fluid from the reservoir as the piston moves away from the partition; a spring engaging the piston, normally yieldably urging it against the head; a central recess in the partition and ducts leading from the recess into the fluid reservoir; a metering sleeve in said recess, said sleeve having an inner annular ridge surrounding the piston extension; metering grooves in the piston extension, cooperating with the annular ridge of the metering sleeve increasingly to restrict fluid flow from the cylinder into the reservoir as the piston is moved to approach the partition; an annular groove in the peripheral wall of the piston engaging the cylinder; ducts in the piston connecting said annular groove with the fluid reservoir; and a sealing ring in said annular groove, engaging the cylinder wall.

8. An hydraulic buffer comprising in combination, a housing; a cylinder assembly in the housing, comprising a tubular member having end members one of which is threadedly received by the housing the other abutting against an inwardly extending portion of the housing; a bearing in a central opening in each of the end members; a piston in the tubular member, said piston having oppositely disposed, coaxial extensions one of which slidably extends through the bearing in the threaded end member, to the exterior of the housing, the other slidably extending through the bearing in the other end member into the housing portion forming a fluid reservoir; means yieldably urging the piston against the threaded end member; openings in the other end member, normally closed at their ends opening into the cylinder, by a spring loaded valve; a metering groove in the extension projecting into the fluid reservoir, said groove tapering from a predetermined depth adjacent the end of the extension to the surface of the extension more adjacent the piston; and a metering collar in an opening of said other end member which opening is in communication with both the cylinder and fluid reservoir, said metering collar cooperating with the extension and its tapered groove to control fluid flow from the cylinder into the fluid reservoir as the piston is moved toward said other end member.

9. An hydraulic buffer comprising in combination; a housing; a centrally apertured partition in said housing dividing it into two compartments, one of which is a fluid reservoir, the other providing a working cylinder; a centrally apertured plug in the outer end of the cylinder opposite the partition; a reciprocal piston in said cylinder, having oppositely disposed extensions one of which is slidably supported in the central aperture of the partition, the other in the central aperture of the plug and extending to the exterior of the housing; a spring interposed between the piston and the partition, urging the piston upon the plug; a fluid flow passage in the partition and about the piston extension slidable therein and providing communication between the working cylinder and the fluid reservoir; means on the last mentioned piston extension for increasingly restricting the flow of fluid through said fluid flow passage in response to movement of the piston toward the partition and in accordance with the degree of movement of the piston; valved ducts in the partition for establishing a substantially free flow of fluid from the reservoir into the working cylinder in response to movement of the piston by the spring; a bleeder duct in the piston providing communication between the annular wall of the piston and the reservoir; and an annular groove in the piston wall between the bleeder duct opening and the surface of the piston engageable with the plug, said groove containing a packing seal frictionally engaging the annular wall of the cylinder.

10. A hydraulic buffer comprising in combination; a housing; a centrally apertured partition in said housing dividing it into two compartments, one of which is a fluid reservoir, the other providing a working cylinder; a centrally apertured plug in the outer end of the cylinder opposite the partition; a reciprocal piston in said cylinder, having oppositely disposed extensions one of which is slidably supported in the central aperture of the partition, the other in the central aperture of the plug and extending to the exterior of the housing; a spring interposed between the piston and the partition, urging the piston upon the plug; means for establishing an increasingly restricted flow of fluid from the working cylinder into the fluid reservoir as the piston is moved toward the partition; valved ports for establishing a substantially unrestricted flow of fluid from the fluid reservoir into the working cylinder as the piston is actuated by the spring; an annular duct in the peripheral wall of the piston, said duct containing a packing seal frictionally engaging the annular wall of the working cylinder; a bleeder duct in the piston and one of its extensions providing communication between the fluid reservoir and the peripheral surface of the piston adjacent the said annular groove and at the side thereof more adjacent the partition; and sealing packings in the plug frictionally engaging the piston extension slidably supported in said plug.

EDWIN F. ROSSMAN.

REFERENCES CITED

The following references are of record in the file of this patent:

UNITED STATES PATENTS

| Number | Name | Date |
| --- | --- | --- |
| 1,704,217 | Rosenthal et al. | Mar. 5, 1929 |
| 1,886,712 | Messier | Nov. 8, 1932 |
| 2,138,513 | Rossman et al. | Nov. 29, 1938 |
| 2,167,928 | Johnson | Aug. 1, 1939 |
| 2,186,011 | DePort | Jan. 9, 1940 |
| 2,298,529 | Dimick | Oct. 13, 1942 |
| 2,366,729 | Hanson | Jan. 9, 1945 |
| 2,373,505 | Schnell | Apr. 10, 1945 |

FOREIGN PATENTS

| Number | Country | Date |
| --- | --- | --- |
| 670,009 | France | Aug. 12, 1929 |
| 765,224 | France | Mar. 19, 1934 |